Dec. 9, 1969        R. W. CRAWFORD        3,482,345

MUSIC BOX VIEWER TOY

Filed March 11, 1968

INVENTOR.
RALPH W. CRAWFORD
BY Crompton, Shaw
& Stephens

ATTORNEYS

United States Patent Office 3,482,345
Patented Dec. 9, 1969

3,482,345
MUSIC BOX VIEWER TOY
Ralph W. Crawford, East Aurora, N.Y., assignor to Fisher-Price Toys, Inc., East Aurora, N.Y., a corporation
Filed Mar. 11, 1968, Ser. No. 712,021
Int. Cl. G09f 27/00, 11/04
U.S. Cl. 40—28.1                   10 Claims

ABSTRACT OF THE DISCLOSURE

A viewer toy includes a wind-up music device for sounding a tune and a drive for advancing a disk of viewable transparencies in stepped rotation. The music device powers the disk drive which translates the uniform rotation of the music device into stepped advancement for the disk.

---

This invention relates to a music box viewer toy.
The objects of this invention include, without limitation, the following:
(a) a toy that is entertaining and educational and offers a wide variety of play activity to a child;
(b) a toy that is rugged, durable, simple, safe, and able to withstand rough play; and
(c) a toy that is easy, and convenient to operate, is tamper-proof and pleasant to the eye, ear, and touch.
These and other objects of the invention will be apparent hereinafter from the specification which describes the invention, its use, operation, and preferred embodiment, from the drawings, which constitute a part of the disclosure, and from the subject matter claimed.
Generally, the inventive viewer toy includes: a body simulating a motion picture camera with a viewing aperture; a disk with concentric, transparent scenes disposable for viewing in the aperture; a wind-up music device; a rotatable disk drive member having the same number of teeth as scenes on the disk; a gear having up to one half the number of teeth of the disk drive member, the gear being driven by the music device to advance the disk drive member; a detent for holding the disk drive member between advancements; and a coupling between the disk and the disk drive member for advancing the disk in stepped rotation. Preferably the toy is arranged with a slot for receiving any one of a plurality of disks, and the disks and disk drive member have over-ridable, mutually mating surfaces. Further preferences are that the detent is a spring engaging adjacent teeth of the disk drive member, the gear is mounted on a shaft extending from the music device, and a transparent plastic window is arranged over the music device.

Figure 1:
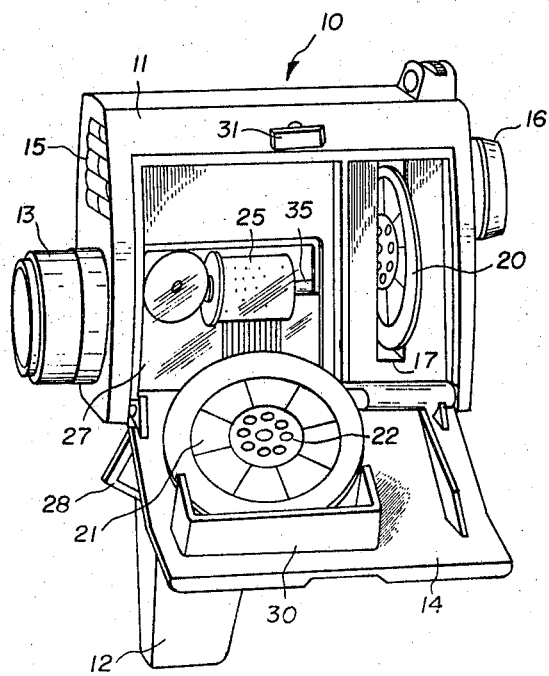
Figure 2:
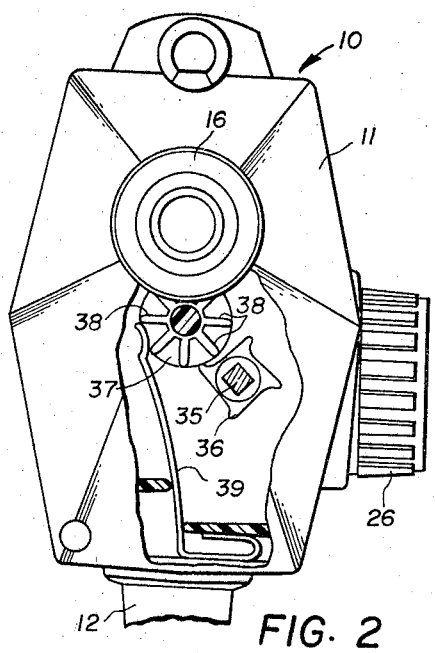
Figure 3:
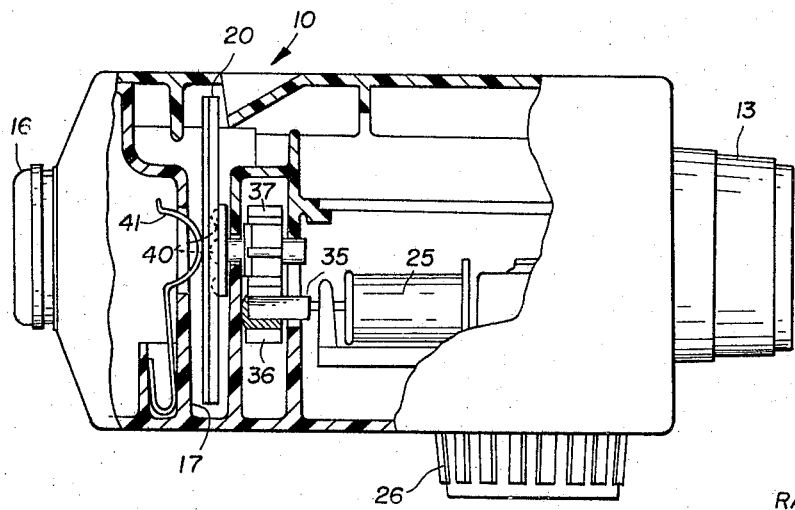

In the drawings:
FIG. 1 shows a perspective view of a preferred embodiment of the inventive viewer toy;
FIG. 2 shows a partially cut-away rear elevation of the toy of FIG. 1; and
FIG. 3 shows a partially cut-away plan view of the toy of FIG. 1.

The toy has a body 11 simulating a motion picture camera and including a handle 12, a simulated lens housing 13, and a door 14. The toy is arranged with a viewing aperture light path extending between front window 15 and an eye piece 16. A slot 17 intersects the light path of the viewing aperture for receiving a viewing disk 20 each of which includes a number of transparent, viewable scenes 21 arranged concentrically so that when a disk 20 is turned in slot 17, scenes 21 can be viewed in succession.

Toy 10 includes a music device 25 that is wound up by knob 26 to sound a tune in a generally known way. Transparent window 27 covers music device 25 and allows observation of the operation of music device 25. Music device 25 is actuated and controlled by trigger 28 on handle 12.

A storage area 30 is arranged inside door 14 for storing disks 20. Door 14 is secured in a closed position by turning latch 31.

A shaft 35 extends from music device 25 toward slot 17 and is uniformly rotated during operation of music device 25. A gear 36 is mounted on shaft 35 to turn with shaft 35, and a disk drive member 37 is mounted for rotation concentrically with a disk 20 disposed for viewing in slot 17. Disk drive member 37 preferably has the same number of teeth 38 as scenes 21 on disks 20, and for the illustrated toy with eight scenes 21 on each disk 20, there are eight teeth 38 on disk drive member 37. Gear 36 has up to one half the number of teeth on disk drive member 37, so that disk drive member 37 can be advanced one tooth and then held in position for an interval before the next advancement. For the illustrated toy, disk 36 has four teeth advancing the eight teeth 38 of disk drive member 37.

A detent spring 39 is lodged in body 11 as illustrated and extends into resilient engagement with adjacent teeth 38 on disk drive member 37. Spring 39 holds disk drive member 37 in each stepped position between advancements by gear 36.

Each of the disks 20 is provided with a ring of concentric apertures 22 that are preferably equal in number to the number of scenes 21 around disks 20. For the illustrated toy 10, eight apertures 22 are arranged around the hub of each disk 20, and each of the apertures 22 corresponds with a respective scene 21.

The disk engaging face of disk drive member 37 is provided with a ring of concentric, convex projections 40 arranged for seating in apertures 22 of a disk 20 arranged for viewing in slot 17. A spring 41 is lodged in body 11 to receive and engage the hub area of a disk 20 to urge the disk into engagement with projections 40. The mutually mating projections 40 and apertures 22 provide a coupling between disk drive member 37 and a disk 20 so that an engaged disk is advanced in stepped rotation with disk drive member 37. Also, the rounded, convex shape of projections 40 allows them to be turned out of apertures 22 if disk 20 is manually moved in slot 17. This makes the disk coupling an over-ridable one so that manual turning of disk 20 does not transmit force back through the drive train to damage music device 25.

In operation, music device 25 is wound up through knob 26 and readied for sounding a tune and advancing a disk. Door 14 is opened by turning latch 31, and a disk 20 is selected from storage area 30 for viewing. The selected disk 20 is placed in slot 17, and spring 41 moves to allow disk 20 to pass over disk drive member 37 and seat against disk drive member 37 with its apertures 22 engaging projections 40. Then trigger 28 is operated to release music device 25 for actuation. To watch the operation of music device 25, door 14 is left open and music device 25 is observed through window 27. Door 14 is closed and latched by latch 31 to simulate a movie camera in operation.

The scenes 21 on disk 20 are viewed through eyepiece 16 by light passing through window 15 of the viewing aperture of toy 10. As music device 25 plays and advances, gear 36 is turned to engage and advance successive teeth 38 of disk drive member 37. Between such advancements, disk drive member 37 is held in place by detent spring 39. The teeth 38 of disk drive member 37 and the coupling of disk drive member 37 to disk 20 through projections 40 and recesses 22 are preferably arranged so that the detenting of disk drive member 37 by spring 38 holds a scene 21 accurately in position for viewing through eyepiece 16. The effect when viewed through eyepiece 16 is that one of the scenes 21 is viewed for a brief interval and then disk 20 is turned one step to bring a successive scene into view. Each scene is held in view for a brief interval between advancements.

Toy 10 is preferably made of rugged material to withstand rough play. Spring 41 allows insertion and removal of disks 20 without damage to the disk advancement drive, and disk 20 can be manually turned to override the coupling between the projections 40 and recesses 22. This protects music device 25 and the disk advancement drive which cannot be subjected to damaging force from manual turning of disk 20 in slot 17.

The inventive viewer toy can have a variety of shapes, can use a single, fixed disk rather than interchangeable disks, and can employ other embodiments of disk advancement drive within the spirit of the invention. The number of scenes on a disk can be varied, and gear 36 can have fewer than one half the number of teeth on disk drive member 37. The fewer the teeth on gear 36, the longer each scene 21 will be held in position for viewing and the greater time will be required for full advancement of a disk 20 through all of its scenes 21.

Other mutually mating surfaces can be arranged between the hub area of disks 20 and disk drive member 37. For example, alternating ridges and grooves can be used. Preferably, the mating portions of the mutually mating surfaces between disk 20 and disk drive member 37 equal the number of scenes 21 on disks 20. This insures that in any mutually mating relationship between disk drive member 37 and disk 20, a scene 21 will be centered for viewing through eyepiece 16 in any detented position of disk drive member 37.

Thus, the inventive toy accomplishes the above stated objects in providing a pleasant, entertaining, educational, and versatile toy of rugged simplicity and reliability. Other features, advantages, and other specific embodiments of this invention will be apparent to those exercising ordinary skill in the pertinent art after considering the foregoing disclosure. In this regard, while a specific preferred embodiment has been described in detail, such disclosure is intended as illustrative, rather than limiting, and other embodiments, variations, and modifications can be effected within the spirit and scope of the invention as disclosed and claimed. Furthermore, the following claimed subject matter is intended to cover fully all the aspects of the disclosed invention that are unobvious over prior art, including all equivalent embodiments.

I claim:
1. In a viewer toy having a body with a viewing aperture and a disk having a plurality of concentrically arranged, transparent, viewable scenes disposable in said body for viewing through said aperture, improved drive means for advancing said disk in stepped rotation, said drive means comprising:
  (a) a wind-up music device including means for sounding a tune;
  (b) a disk drive member mounted for rotation;
  (c) said disk drive member having teeth equal in number to the number of said scenes on said disk;
  (d) a gear having up to one-half the number of teeth of said disk drive member with said gear teeth disposed to engage the teeth of said disk drive member;
  (e) means for driving said gear in uniform rotation with said music device advance said disk drive member;
  (f) detent means for holding said disk drive member between advancements by said gear teeth to give said disk drive member a stepped rotation; and
  (g) means for imparting the stepped rotation of said disk drive member to said disk.

2. The toy of claim 1 including a shaft driven by and extending from said music device, said gear being mounted on said shaft.

3. The toy of claim 1 wherein said detent means comprises a spring disposed for engaging adjacent teeth of said disk drive member.

4. The toy of claim 1 wherein said body is formed with a slot for receiving any one of a plurality of said disks for viewing, and including a spring for biasing said disks against said disk drive member.

5. The toy of claim 1 including a transparent, plastic window arranged over said music device and through which the operation of said music device can be observed.

6. The toy of claim 1 wherein a radial face of said disk drive member and the central area of said disk are formed with over-ridable and mutually mating surfaces biased for mutual engagement.

7. The toy of claim 6 wherein said mutually mating surfaces are formed with mating portions equal in number to the number of said scenes on said disks.

8. The toy of claim 7 wherein said disk is formed with concentric apertures in its central region equal in number to the number of said scenes on said disk, and said disk drive member is formed with an equal number of concentric, convex projections arranged to extend into said apertures.

9. The toy of claim 8 wherein said body is formed with a slot for receiving any one of a plurality of said disks for viewing, and including a spring for biasing said disks against said disk drive member.

10. The toy of claim 9 including a shaft driven by said music device, said gear being mounted on said shaft, and wherein said detent means comprises a spring disposed for engaging adjacent teeth of said disk drive member.

References Cited

UNITED STATES PATENTS

| | | | |
|---|---|---|---|
| 1,128,488 | 2/1915 | Mossé | 40—28.1 |
| 1,504,552 | 8/1924 | Hales | 40—28.1 |
| 2,092,761 | 9/1937 | Klein | 40—28.1 |
| 2,554,941 | 5/1951 | Dobrowski | 40—28.1 |
| 3,026,640 | 3/1962 | Ogdon | 40—70 X |

EUGENE R. CAPOZIO, Primary Examiner

W. J. CONTRERAS, Assistant Examiner

U.S. Cl. X.R.

40—70